(12) United States Patent
Shaw

(10) Patent No.: US 8,332,258 B1
(45) Date of Patent: Dec. 11, 2012

(54) BUSINESS TO BUSINESS DYNAMIC PRICING SYSTEM

(75) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1125 days.

(21) Appl. No.: 11/893,703

(22) Filed: Aug. 17, 2007

Related U.S. Application Data

(60) Provisional application No. 60/953,955, filed on Aug. 3, 2007.

(51) Int. Cl.
*G06Q 99/00* (2006.01)

(52) U.S. Cl. ............ 705/7.31; 705/7.29; 705/7.35; 702/185

(58) Field of Classification Search ............ 705/1.1, 705/10, 22, 26, 400, 26.1, 7.32, 7.37, 7.31, 705/7.35; 702/185
See application file for complete search history.

(56) References Cited

U.S. PATENT DOCUMENTS

| | | | | |
|---|---|---|---|---|
| 7,058,587 | B1 * | 6/2006 | Horne | 705/7.22 |
| 8,036,929 | B1 * | 10/2011 | Reisman | 705/7.29 |
| 2001/0027429 | A1 * | 10/2001 | Uemura | 705/27 |
| 2003/0216969 | A1 * | 11/2003 | Bauer et al. | 705/22 |
| 2005/0240464 | A1 * | 10/2005 | Borovich et al. | 705/10 |
| 2005/0256753 | A1 * | 11/2005 | Veit et al. | 705/7 |
| 2007/0060129 | A1 | 3/2007 | Ramer et al. | 455/439 |
| 2007/0061245 | A1 | 3/2007 | Ramer et al. | 705/37 |
| 2007/0061300 | A1 | 3/2007 | Ramer et al. | 707/3 |
| 2007/0061301 | A1 | 3/2007 | Ramer et al. | 707/3 |
| 2007/0061302 | A1 | 3/2007 | Ramer et al. | 707/3 |
| 2007/0073717 | A1 | 3/2007 | Ramer et al. | 707/10 |
| 2007/0073722 | A1 | 3/2007 | Ramer et al. | 707/10 |
| 2007/0088599 | A1 * | 4/2007 | Vulpitta et al. | 705/10 |
| 2007/0219930 | A1 * | 9/2007 | Daoud et al. | 705/400 |

OTHER PUBLICATIONS

Goodman, David N., "Old Cell Phones Find New Life in Poorer Nations", Oct. 29, 2006, the.honoluluadvertiser.com, 2 pages.*

* cited by examiner

*Primary Examiner* — John Hayes
*Assistant Examiner* — Freda A Nelson
(74) *Attorney, Agent, or Firm* — Woodcock Washburn LLP

(57) ABSTRACT

Methods and systems are disclosed for analyzing products. An embodiment provides a method. In one implementation, a method includes but is not limited to identifying a weak attribute of a component in the product; and generating a recommendation related to the weak attribute of the component. In addition to the foregoing, other aspects are described in the description, claims, and drawings that form the present disclosure.

14 Claims, 11 Drawing Sheets

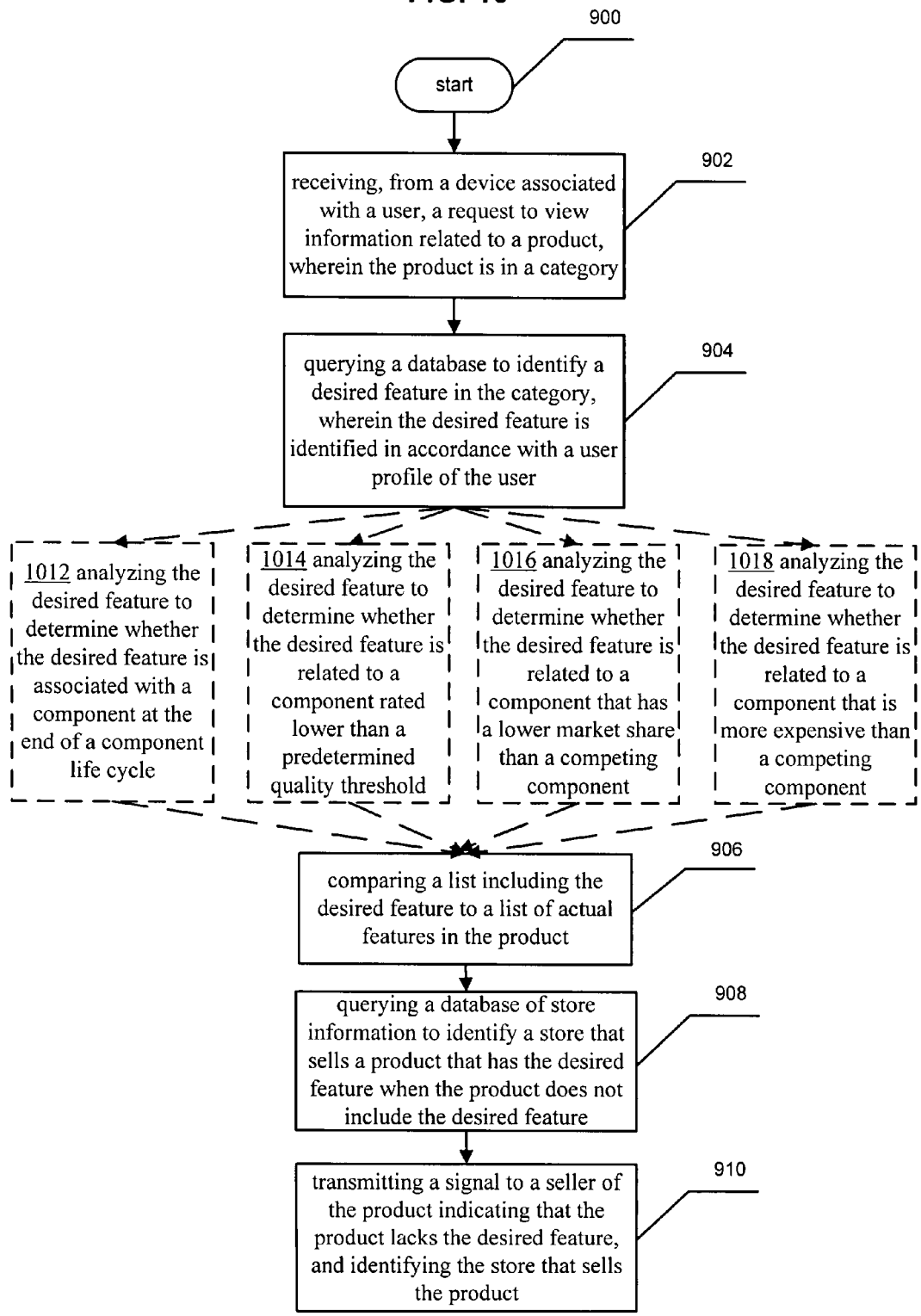

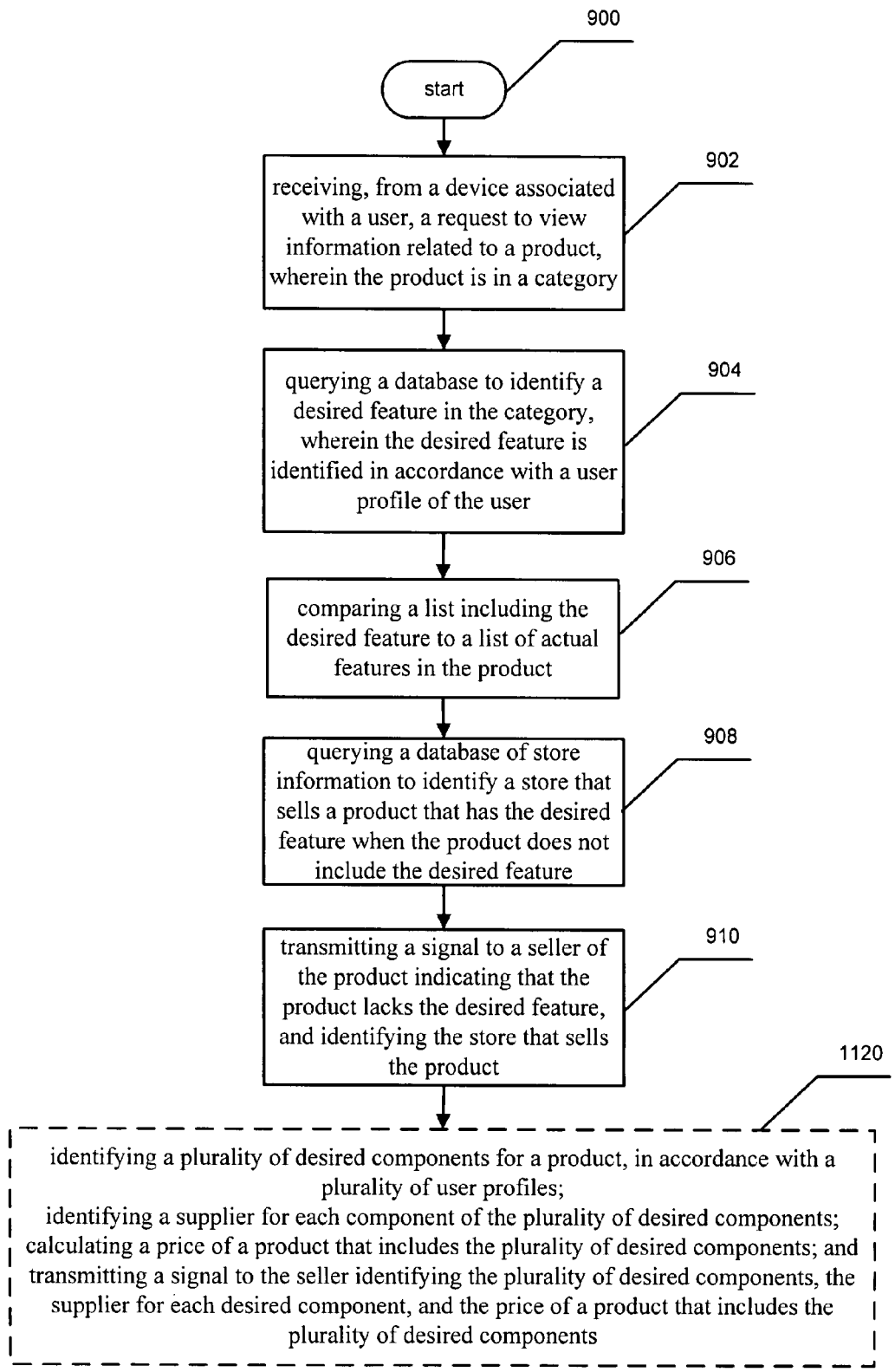

BUSINESS TO BUSINESS DYNAMIC PRICING SYSTEM

CROSS REFERENCE TO RELATED APPLICATIONS

This application claims priority to U.S. Patent Application No. 60/953,955, filed on Aug. 3, 2007, the contents of which are herein incorporated by reference in their entirety.

BACKGROUND

A large number of people today own mobile devices, and some regard their mobile device as a necessity. It is common for a person to carry their device everywhere they go, and leave their device on 24 hours a day. This situation offers service providers a unique opportunity to sell services, and products to individuals that will always be connected to the system.

Currently, the technological advances in this area have been directed towards targeted advertising and targeted search results. While these services are important, these are just a few of the services that use data such as a customer's profile.

SUMMARY

In one embodiment of the present disclosure, a method includes, but is not limited to, identifying a type of product that has been purchased less than a predetermined number of times; accessing a database of attributes that includes attributes for a plurality of components in the product; identifying a weak component in the product, wherein a weak component is associated with an attribute that has a rating lower than a predetermined threshold; generating a recommendation related to the weak component; and transmitting a signal indicative of the recommendation to a company that sells the product. In addition to the foregoing, other method aspects are described in the claims, text, and drawings forming part of the present disclosure.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In another embodiment, a method includes, but is not limited to, receiving, from a device associated with a user, a request to view information related to a product, wherein the product is in a category; querying a database to identify a desired feature in the category, wherein the desired feature is identified in accordance with a user profile of the user; comparing a list including the desired feature to a list of actual features in the product; modifying the price of the product when the list of the actual features in the product does not include the desired feature; and transmitting a signal indicative of the modified price of the product to the device. In addition to the foregoing, other method aspects are described in the claims, text, and drawings forming part of the present disclosure.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In another embodiment, a method includes, but is not limited to, receiving, from a device associated with a user, a request to view information related to a product, wherein the product is in a category; querying a database to identify a desired feature in the category, wherein the desired feature is identified in accordance with a user profile of the user; comparing a list including the desired feature to a list of actual features in the product; querying a database of store information to identify a store that sells a product that has the desired feature when the product does not include the desired feature; and transmitting a signal to a seller of the product indicating that the product lacks the desired feature, and identifying the store that sells the product. In addition to the foregoing, other method aspects are described in the claims, text, and drawings forming part of the present disclosure.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

The foregoing summary is illustrative and not intended to be limiting.

BRIEF DESCRIPTION OF THE DRAWINGS

FIG. 10 depicts an alternative embodiment of the operational flow chart 900 of FIG. 9.

FIG. 11 depicts an alternative embodiment of the operational flow chart 900 of FIG. 9.

DETAILED DESCRIPTION OF ILLUSTRATIVE EMBODIMENTS

Figure 1:
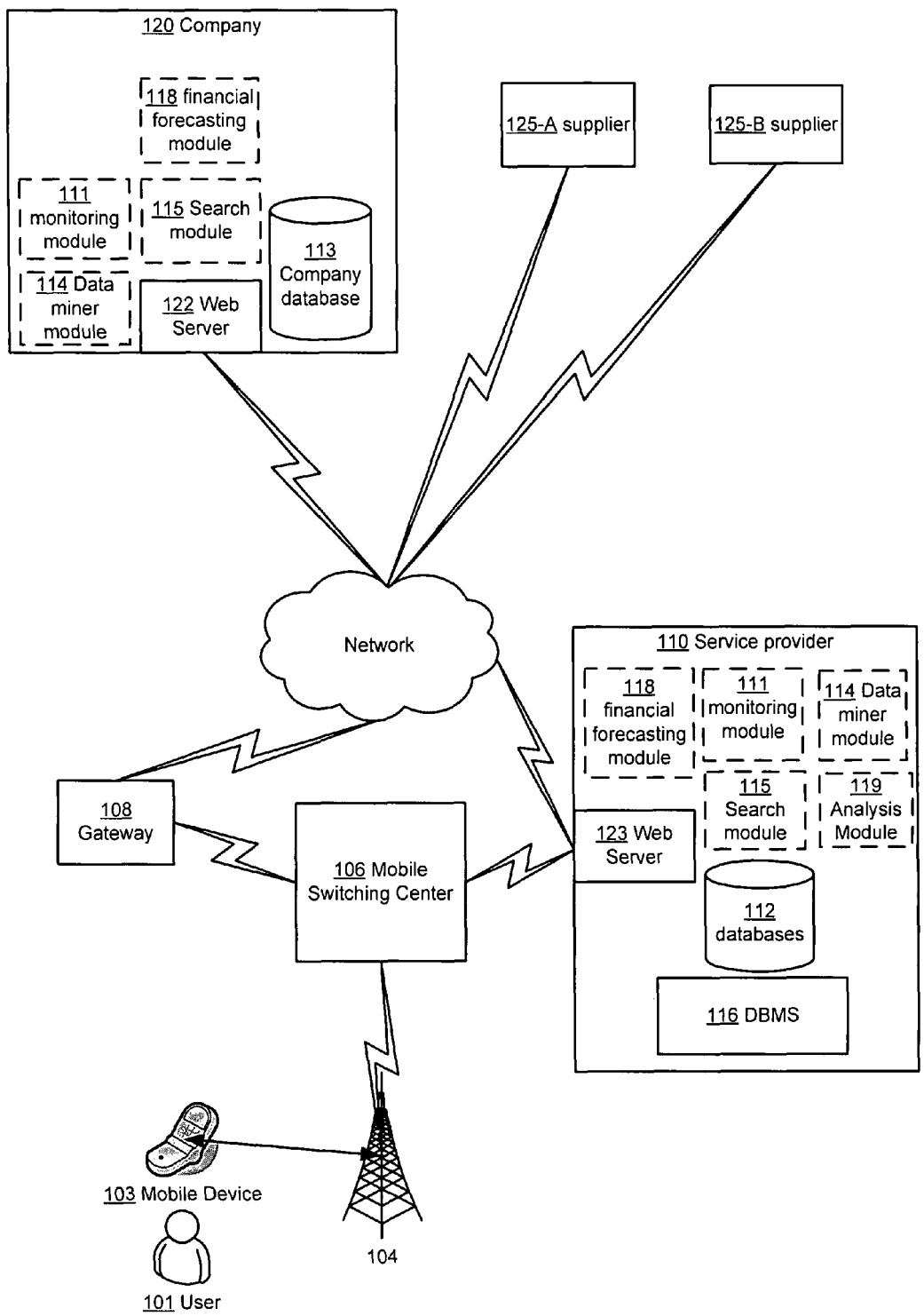
FIG. 1. depicts an exemplary system diagram wherein aspects of the business to business dynamic pricing can be practiced.

The example system of FIG. 1 is described in more detail in relation to the operational procedures described in FIG. 2 through FIG. 11. The following description of FIG. 1 is provided to give a general overview of the figure and one skilled in the art will note that the example elements depicted in FIG. 1 are provided to provide an example operational context for practicing aspects of the present disclosure. Accordingly, the example operational context is to be treated as illustrative and in no way limit the scope of the claims.

FIG. 1 depicts an example operating environment wherein operational procedures of the present disclosure may be practices. FIG. 1 depicts a service provider 110 that, in one embodiment, can own, or use, electronic equipment to provide services that include, but are not limited to, wireless telephone services, SMS messaging services, targeted advertisements, and services such as those taught by the present disclosure. In at least one additional embodiment, the service provider 110 may be a web presence that does not maintain a network, but instead leverages a network operated by a wireless carrier, or Internet Service provider. FIG. 1 depicts a user 101 that may own, or have access to, a mobile device 103. As one skilled in the art will appreciate, while one device 103 is depicted the system can be configured to service multiple devices. One skilled in the art will also recognize that a device 103 may include, but is not limited to, a cellular phone, a pocket pc, a personal digital assistant, or any device that communicates via a mobile communications protocol, such as the advanced mobile phone system, code division multiple access, time division multiple access, global system for mobile communications, etc. The mobile device 103 may be in wireless communication with a base station 104. Generally, the base station 104 includes any equipment necessary for transmitting and receiving radio signals from mobile device 103, and the base station 104 may be operably coupled to a base station controller (not shown) that controls the base station 104.

The exemplarily system depicted in FIG. 1 also includes a mobile switching center 106 that can be operably coupled to a base station controller (not shown). The mobile switching center 106 can provide services, such as voice, data, fax, and short message services to the mobile devices within the area that it serves. The mobile switching center 106 can be coupled to a gateway 108 that acts as an interface between the mobile network and a packet based network, such as the internet.

In addition to being connected to a gateway 108, the mobile switching center 106 can be connected to a service provider 110. As depicted in FIG. 1, a service provider 110 may include a combination of hardware and/or software that may include, but is not limited to, one or more databases of information 112, a database management system 116 operably coupled to the one or more databases 112, a data mining module 114, a monitoring module 111, a search module 115, a financial forecasting module 118, and an analysis module 119, that will be described in more detail below. One skilled in the art will note that elements 111, 114, 115, 118, and 119 are indicated in dashed lines, which is indicative of the fact that they are considered optionally located at their respective position in FIG. 1. One skilled in the art can also appreciate that elements 111, 114, 115, 118, 119 are described herein as separate elements for clarity purposes, and that the disclosure is not limited to these embodiments. More specifically, while elements 111, 114, 115, 118, and 119 are depicted, and described as separate, one or more of them can be embodied in the same hardware, software, and/or firmware, i.e., in some embodiments a monitoring module 111 may be part of the same process, or circuitry, as search module 115, and/or data miner 114.

Continuing with the description of FIG. 1, the database management system 116 may include one or more software programs designed to manage one or more databases of information 112. In some embodiments, the database(s) 112 can include user accounts associated with a plurality of users, and information related to a plurality of products sold by a company 120. In addition, the databases 112 may contain information related to suppliers, 125-A and/or 125-B. In general, a supplier 125-A, or 125-B can be a supplier of the components that can be used to create a plurality of products (i.e., microprocessors, RAM, wireless adaptors, PIM software, word processor software, or any other component), or the suppliers can be a supplier of the finished good, i.e., a wholesaler, to a retailer store, company 120 for example. In an embodiment, a catalog of information, for example, can be provided to the company 120 from suppliers 125-A, and/or 125-B, or in other embodiments, a catalog from the suppliers 125-A and/or 125-B can be provided to the service provider 110 for central storage in a database 112. In some embodiments, the databases 112 may comprise a relational database, an object oriented database, or a database that incorporates features of either type.

Following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. Those skilled in the art will also note that some of the operations in FIG. 2-11 are depicted in dashed lines, which is indicative of the fact that they are considered optional. In addition, those skilled in the art will further appreciate that the style of presentation used herein also lends itself well to modular and/or object-oriented program design paradigms.

Figure 2:
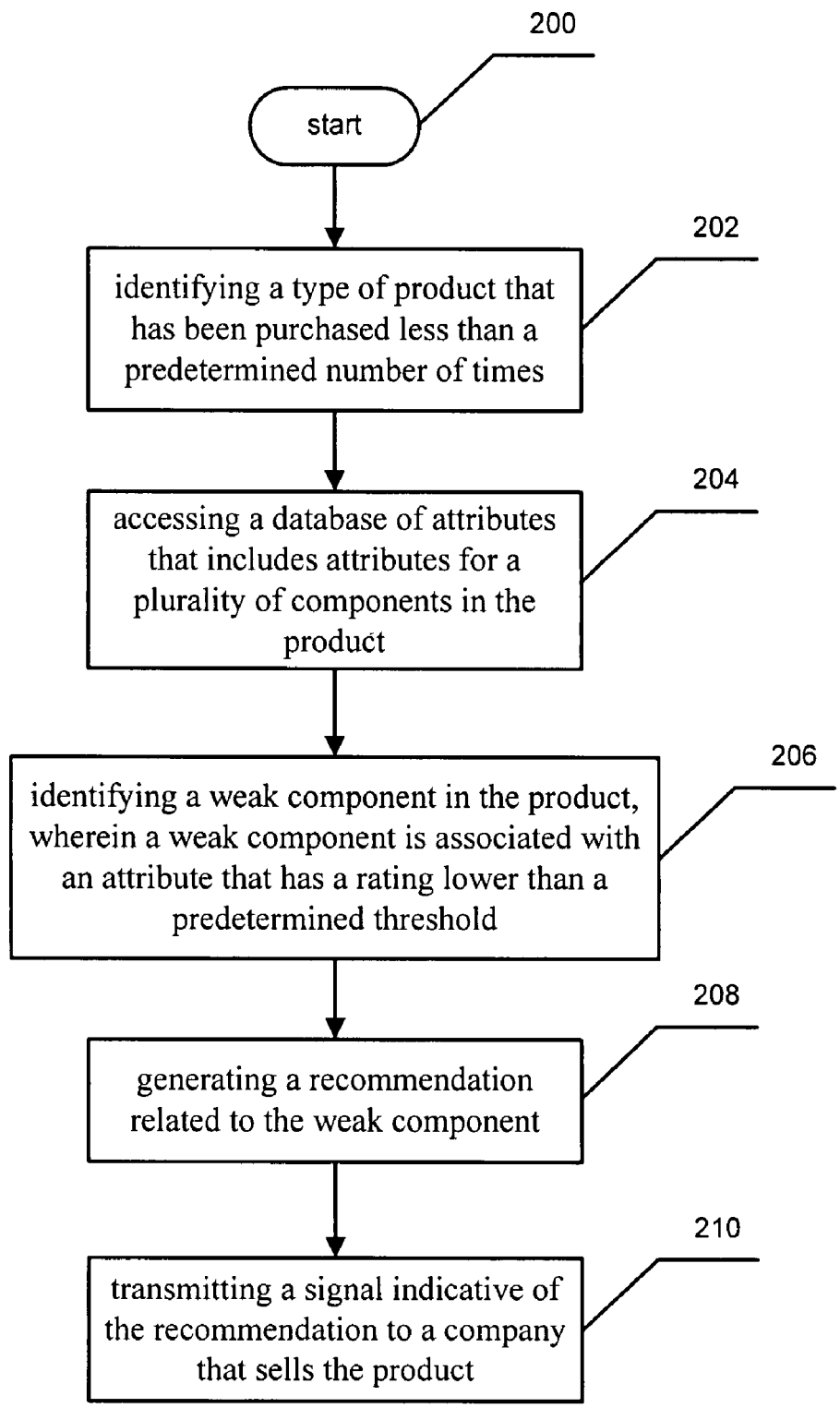
FIG. 2 depicts an exemplary operational flow chart 200 illustrating aspects of the present disclosure.

FIG. 2 illustrates the operational flow 200 representing example operations relating to analyzing a product that optionally may include one or more of the operations 200, 202, 204, 206, 208, and 210.

Operation 200 begins the operational procedure, and operation 202 illustrates identifying a type of product that has been purchased less than a predetermined number of times. For example, and referring to FIG. 1, a monitoring module 111, i.e., one or more hardware, software, and/or firmware modules can be configured to monitor purchasing trends of one or more products for sale by a company 120, and determine if products that are, for example, not selling well. In some example embodiments, the monitoring module 111 can be a software routine configured to run on a web server 122 and record how many users visit a product's associated webpage, and how many user's subsequently purchase the product. In some embodiments, the monitoring module 111 can be configured to analyze product orders received via a website. In other embodiments, the monitoring module 111 can be configured to review the daily sales figures of a company 120 to identify products that are not selling well.

In a specific example, the monitoring module 111 can be configured to determine whether a product is selling well by using a variety of techniques. In one embodiment, a counting algorithm can be configured to count how many times a type of product, e.g., a certain model of a cellular phone, is purchased in a time frame, e.g., 1 month, 1 quarter, etc. An operator of the system can input a threshold that the counting algorithm can use to determine when a product is purchased less than an optimal amount of times. A specific example can include an operator configuring a program to identify products sold less than N times in a month (where N is an integer greater than 1). In another embodiment, the operator of the system may configure the system to compare all the products of a certain type to each other. In this example, simple statistical techniques can be used to determine whether one product is selling worse than another in the same type. In another example embodiment, a procedure can be used to rank a product on the basis of its relative market share in order to identify whether the product has been purchased less than an optimal amount of times.

Referring again to FIG. 2, it shows operation 204 that illustrates accessing a database of attributes that includes attributes for a plurality of components in the product. For example, and in addition to the previous example, once a product has been identified by the monitoring module 111, a database 112 of attribute information can be accessed, and searched by a search module 115. Generally speaking, a search module 115, i.e., an information retrieval system can include a program configured to query a database 112 for attributes of products. Generally, an attribute can be a property of the product that provides information, such as metadata, about the product. In some examples, attributes can be for the product as a whole, or for the components in the product. These attributes can identify various characteristics of the product, and/or components in the product, such as economic information related to the market the product is in, and user information related to what the users think about the product.

As mentioned briefly above, in some embodiments an attribute can be associated with economic information related to the product. Economic information in some aspects of the present disclosure can reflect internal, and external market related pressure on the product, or pressure on the components in the product. Typically, a device such as a mobile phone will have multiple components, i.e., flash memory, RF transceiver, touch pad, screen, microprocessor, and software, etc. A financial forecasting module 118 can be programmed with the latest supply/demand information for the particular components, and information related to a component's life cycle for example. This information can be processed for each component in the product to identify whether there is any growth potential for the component, whether the component is at the end of its life cycle, whether the component includes older, outdated technology, etc.

In another embodiment, information related to complaints received by users can be entered into the database 112, and the complaint can be associated with an attribute of a component, i.e., if a user 101 returns a phone because it drops calls, the user information can be associated with, for example, the antenna of the phone. In another example, multiple users may contact a call center and complain about the battery life of their cellular phone. A customer service representative can open up the user's account on a terminal, and input information indicating that a subscriber is upset about the performance of the battery. The representative may have one or more fields where they can enter information related to the problem. The data miner 114 can process the user review information and identify that subscribers with certain characteristics are upset with the battery performance of the cell phone and associate this negative feedback with the battery of the phone.

Generally speaking, this information can be stored in a database 112 maintained by the service provider 110, and once it is stored in one or more databases 112 a data mining module 114 can process the information to discover relationships between attributes to other attributes, other components, and/or other products.

Operation 206 illustrates identifying a weak component in the product, wherein a weak component is associated with an attribute that has a rating lower than a predetermined threshold. For example, and in addition to the previous example, an analysis module 119 can be configured to process the attribute information in order to discover whether any of the components in the product can be considered a weakness of the product. For example, the analysis module 119 can be configured to process information related to each component in a product. In some embodiments, this information can be in the form of market information related to the component, user review information, quality information about the manufacture of the component, or the component itself, etc. This information can be processed and the analysis module 119 can create a weakness score for each component. If, for example, the weakness score for a component is lower than a threshold, the component can be flagged as a weakness of the product. In some embodiments of the present disclosure, a system administrator can input weakness thresholds that the analysis module 119 can use to determine whether individual components are weak. In other embodiments, a weakness threshold can float, based on how the component compares to other similar components. For example, a weakness score of a component may be extremely good one day, and the next day a newer version of the component can be released to the public. In this instance, if the component is reviewed again, the results may be different based on the fact that a new component can impact the comparative evaluation the analysis module 119 performs in this embodiment.

Operation 208 illustrates generating a recommendation related to the weak component; and transmitting a signal indicative of the recommendation to a company that sells the product. For example, and in addition to the previous example, once a weak component in a product has been identified, in some embodiments, a recommendation can be generated that provides information to the company 120 that sells the product. For example, the recommendation can be in the form of a report that can include, but is not limited to, information such as how the product was identified, what attribute of what component affected the weakness score, and one or more recommendations related to the component.

In one embodiment of the present disclosure, the analysis module 119 can generate a report that includes a listing of the components in a product that are considered exceptional in view of their weakness scores. For example, a component may be analyzed, and the analysis module 119 can conclude that the component is better than 90% of its competitors, in this example, the report may emphasize this strength. For example, a cellular phone that is not selling well may have an antenna that has thousands of positive comments associated with it (comments about how the phone does not drop calls, or how the antenna is aesthetically pleasing for example). Even if the product needs to be redesigned, a company 120 may want to know if they should use this antenna in the next version of the phone.

In some embodiments, the recommendation can include advice related to the opportunity of the product in the market it currently is competing in. For example, if a product is competing in a certain market, i.e., a cellular phone currently marketed to professionals, and the product has a negative user review rating due to the fact that it does not have features that professionals want, i.e., no enterprise functionality, the financial forecasting module 118 may determine that the opportunity for this product in this market is weak, and recommend changing the product, or changing the focus of advertising strategies.

In some embodiments of the present disclosure, the recommendation can include advice related to threats to the product in its market. For example, a threatened product may include a product that was successful for a time, but is now losing market share to a new competing product. In this example, the recommendation may include advice to incorporate some of the components with exceptional weakness scores in similar products into the threatened product.

Operation 210 illustrates transmitting the recommendation to a company that sells the product. For example, and in addition to the previous example, after the recommendation has been generated, in some example embodiments, the recommendation can be transmitted to the company that sells the product, or to a company that manufactures the product. In some example embodiments, the recommendation can be included in a report. In this example, a report can be transmitted in the body of an email, in a spreadsheet electronically transmitted to the company 120, or in any format that can be perceivable by a person working for a company 120.

Figure 3:
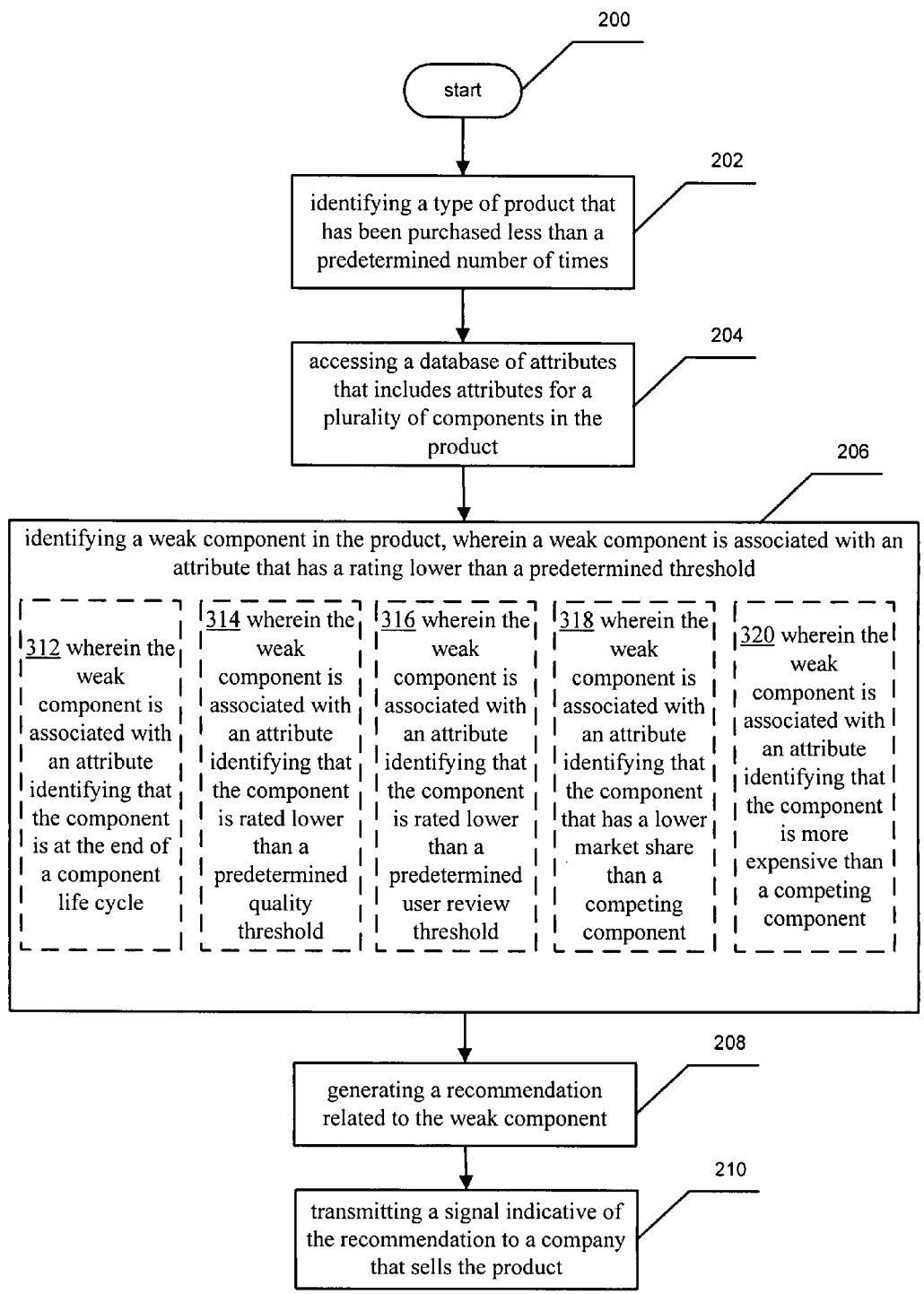
FIG. 3 depicts an alternative embodiment of the operational flow chart 200 of FIG. 2.

Referring now to FIG. 3, it depicts an alternative embodiment of the operational procedure 200 of FIG. 2 including additional operations 312, 314, 316, 318, and 320. Operation 312 shows identifying a weak component in the product, wherein the weak component is associated with an attribute identifying that the component is at the end of a component life cycle. For example, a life cycle of a component describes the components introduction to the market, growth in the market, maturity, and decline in the market. If a component is newly introduced into the market, the component may not have a sufficient market share, however there is potential for the component's share to grow. If the analysis module 119 determines that sales of a component is declining, for example, an attribute can be generated that identifies that the this component is a weakness of the product due to the fact that the component is nearing the end of its useful life.

Referring again to FIG. 3, it additionally depicts operation 314 that shows identifying a weak component in the product, wherein the weak component is associated with an attribute identifying that the component is rated lower than a predetermined quality threshold. In this example, a weak attribute can be generated that identifies that the quality of the product falls below a predetermined criteria. For example, a component that has serious flaws, i.e., it fails, or is made by a company with a bad reputation, an attribute can be generated that identifies this. When the analysis module 119 performs its analysis, it can determine that this component is a weakness of the product. In certain embodiments, information such as the reputation of the company that manufactures the component can be tracked by various means. For example, the database 112 can include information obtained from the better business bureau that rates the company that makes the product. In another example situation, technical reviews of the components may be performed. The results of their analysis can be input into a database 112. Similar to that described above, an administrator can set a weakness threshold for quality or the analysis module 119 can average the scores of the components in this field to generate a quality threshold.

Referring again to FIG. 3, it additionally depicts operation 316 that shows identifying a weak component in the product, wherein the weak component is associated with an attribute identifying that the component is rated lower than a predetermined user review threshold. In addition to economic related information, the database 112 can be configured to contain information obtained from users of the services offered by the service provider 110. This information, in turn can be used to generate user review attributes related to the components in the product. For example, each user can provide feedback to the service provider 110 related to a plurality of products, and the service provider 110 can process this information to determine what users think are the positive, or negative attributes, of the components in a product. The service provider 110 can either explicitly, or implicitly, obtain information from the users. For example, in some embodiments of the present disclosure, information may be explicitly given by users such as social security numbers, driver license numbers, home addresses, job descriptions, group membership information, i.e., whether the user 101 is members of a family group (e.g., cellular phone plan), a work group, and/or members of a group based on their interests (e.g., subscribe to consumer electronics RSS feed), etc. In some embodiments, the user profile may contain information such as what products the user 101 has purchased in the past from a website affiliated with the service provider 110.

In one example, the service provider 110 can obtain user review information by configuring a webpage to allow a user 101 to submit feedback in a comment section, or a 1-10 rating of components section. For example, a webpage may include a section with a series of predetermined questions about, for example, a camera embedded in a mobile device 103. The questions can be selected in a way to obtain information that can help the service provider 110 determine whether the users think a component is weakness, and why the users think the component is weakness. The service provider 110 may provide the user 101 with some incentive to provide feedback, such as giving the user 101 coupons that can be used at stores. In other situations, this information can be obtained, by call centers maintained by the company 120, or call centers affiliated with the service provider 110. The call centers can handle customer service calls about the products sold by the company 120, or any other company. In the event that a customer calls and is unsatisfied with a product, a representative can determine what the subscriber is upset about. The service representative can counsel the user, and can enter information related to the problem into the database 112. In other situations, products may be returned to the company 120, and a store clerk can ask questions about why the customer is returning the product. The clerk can then enter information into a database 112 and the information can be subsequently processed by a data mining module 114. The user review attributes can be used by the analysis module 119 to discover a user review weakness score of the component. Similar to that described above, an administrator can set a weakness threshold for user reviews, or the analysis module 119 can average the scores users give for the components and similar components to generate a user review threshold rating.

Referring again to FIG. 3, it additionally shows operation 318 that illustrates identifying a weak component in the product, wherein the weak component is associated with an attribute identifying that the component that has a lower market share than a competing component. For example, in certain embodiments of the present disclosure, the analysis module 119 can compare the market share of the component to the market share of competing components to determine whether the component is a weakness of the product. For example, in some situations there may be multiple components of similar type that hit the market at the same time, i.e., the industry has not yet decided on a standard way to create the component, or settled on a standard protocol. In this instance, the analysis module 119 can analyze the market share of each component in order to predict what direction the market will go, i.e., what format or protocol the industry will conform to, if a majority of companies are using a component that uses the same protocol, or form factor, this may signal that components using a different protocol or form factor may be undesirable. In this example, if the market share of a component is lower that its competitor, or lower than a predetermined percentage, the component can be identified as a weakness to the product.

Referring again to FIG. 3, it additionally shows operation 320 that illustrates identifying a weak component in the product, wherein the weak component is associated with an attribute identifying that the component is more expensive than a competing component. In some example embodiments of the present disclosure, the analysis module 119 can be configured to determine that a component of the product is a weakness when the component costs more to purchase from a manufacture, or more to make, than a competing component. For example, there may be multiple companies that create a components that perform the same function, for example, a 802.11 transceiver integrated circuit manufactured by different companies. Certain companies may sell their component, in this example the IC, at different prices depending on the companies financial situation, outstanding loans, fabrication process, etc. In certain embodiments of the present disclosure, the analysis module 119 can compare the price of the component to similar components sold by different manufactures and determine if the price of the component currently in the product is a weakness of the product. Similar to that above, a component can be considered a weakness in one embodiment if it costs more than a competitor's version, and in other embodiments, if it priced more than a predetermined percentage of the lowest selling competitor's component, or the average price of the competitor's components.

Figure 4:
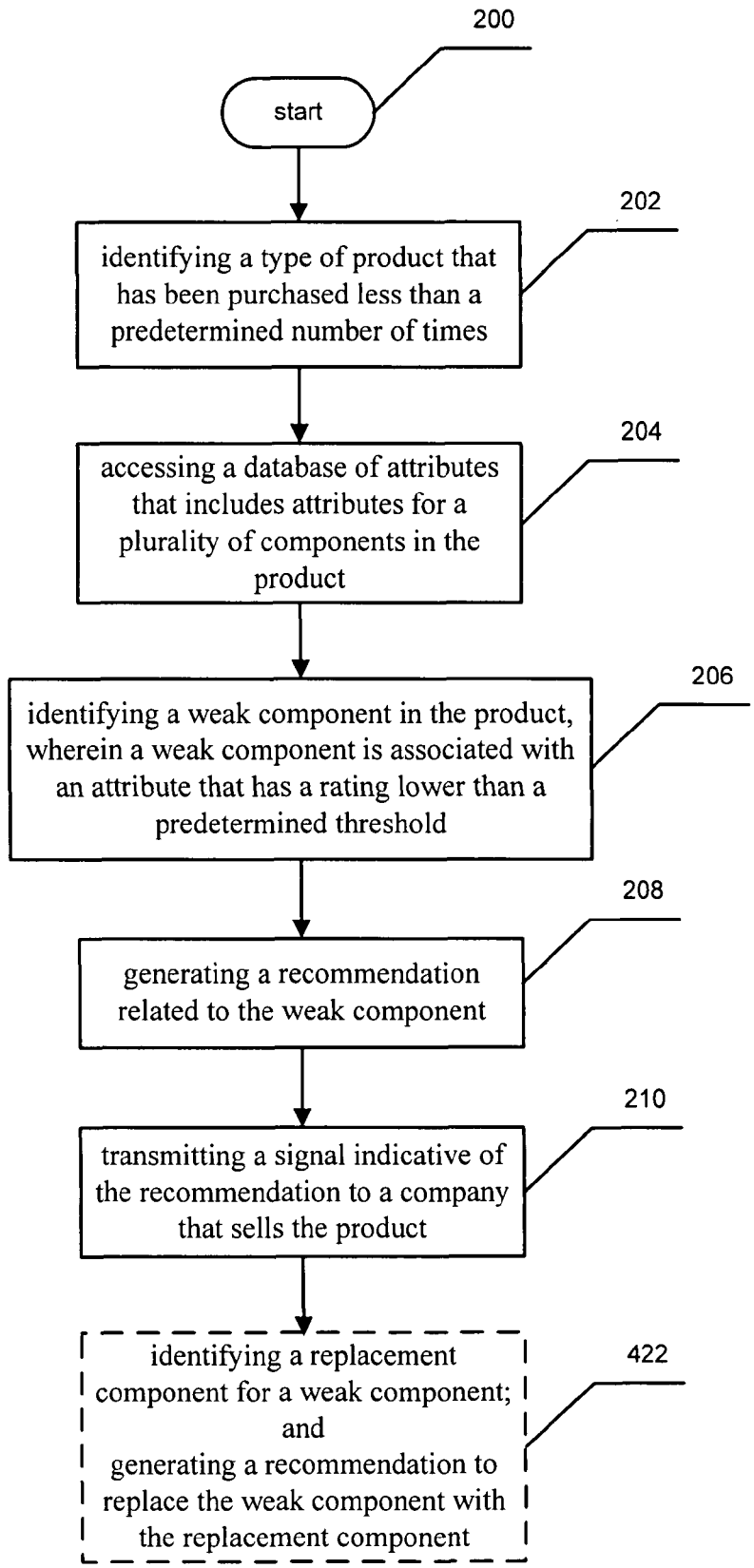
FIG. 4 depicts an alternative embodiment of the operational flow chart 200 of FIG. 2.

Referring now to FIG. 4, it depicts an alternative embodiment of the operational procedure 200 of FIG. 2 including an additional operation 422 that shows identifying a replacement component for a weak component; and generating a recommendation to replace the weak component with the replacement component. In one embodiment, a recommendation related to the weak component can include providing a list of substitute components to the company 120. For example, the search module 115 can attempt to maximize the strengths of, and opportunity for, the product while attempting to minimize the weaknesses of, and threat to, the product by searching a list of component suppliers provided by suppliers 125-A and/or 125-B. In this example, the recommendation may be to switch suppliers of a certain part from supplier 125-A to 125-B, or the recommendation may be to switch selling a product sold by supplier 125-A to a product sold by 125-B. For example, in some embodiments of the present disclosure, a component may be identified as a weakness of the product, however if the selling price for the product can be reduced, the offset in price can overcome the weaknesses of the component. In this example, the search module 115 can search for suppliers that sell the same, or essentially the same, component at a cheaper price. In this case, a recommendation can indicate that a cheaper version of the weak component can be obtained, and the price of the product can be reduced in view of the replacement component.

Figure 5:
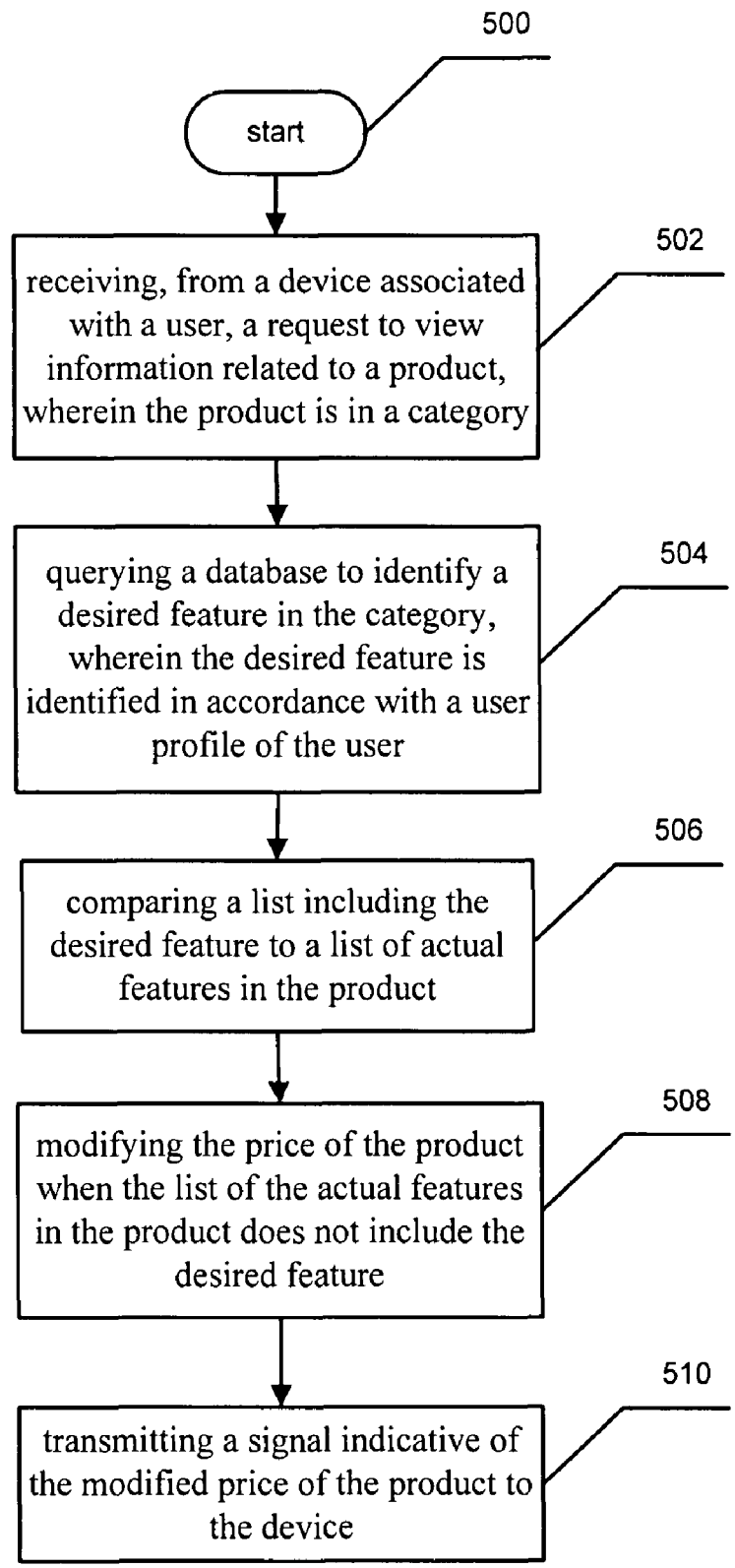
FIG. 5 depicts an exemplary operational flow chart 500 illustrating aspects of the present disclosure.

Referring now to FIG. 5, it depicts an example operational procedure depicting aspects of the present disclosure that can include one or more of the example operations 500, 502, 504, 506, 508, and 510. As shown by FIG. 5, operation 500 beings the operational procedure, and operation 502 illustrates receiving, from a device associated with a user, a request to view information related to a product, wherein the product is in a category. For example, in one embodiment of the present disclosure, a web server 122 of a company 120 can be configured to receive requests from devices that have a network connection to the company 120. In one embodiment, a device can be a mobile device 103, such as a cellular phone, PDA, etc., while in another embodiment the device can be a personal computer connected to a network such as the Internet. In alternative embodiments, instead of a web server of the company 120 receiving a request, the service provider 110 can receive the request to view information about a product, sold by company 120. In this embodiment, a web server 123 of service provider 110 can host information about products offered by company 120, and have access to the company's database 113 that includes product information, or have the information stored in its own database 112. In one example embodiment, the request can be to view information about a product, i.e., the request may be to view a web page that includes information about a cellular phone.

Continuing with the example, operation 504 illustrates querying a database to identify a desired feature in the category, wherein the desired feature is identified in accordance with a user profile of the user. For example, and in addition to the previous example, once a request to view information about a product is received, the identity of the user 101 associated with the device can be determined by, in the instance that the device is a mobile device 103, a monitoring module 111 that can be configured to scan identification information sent by the mobile device 103. In some embodiments, the identification information can include the phone number of the mobile device 103. In this instance, the number can linked to a user account maintained by the service provider 110. After the identity of the user 101 is determined, a search module 115, optionally located at the service provider 110, or at the company 120, can query a database 112 to determine what features the user 101 wants in products similar to those the user 101 wants to view information about. For example, if a user 101 is trying to view a web page with information about a cellular phone, the search module 115 can query the database for features that the user 101 wants in a cellular phone category.

In one example embodiment, a feature of a product can be a something the product offers, such as, a characteristic, a part, a color, an ability, or something else distinctive. For example, a mobile device may have hundreds of features, such as its form factor, the material its made out of, its battery life, the dimensions of its user interface, the software included with the device, the software compatible with the device, etc. Those skilled in the art can appreciate that the preceding list is exemplary and that other features can exist. The features of a product can be identified using various techniques, and stored in a database such as database 112. In some example embodiments, the database 112 can store information obtained from users that indicate what products or services they like, and what features in products they want. For example, each user 101 can provide feedback to the service provider 110 related to a plurality of products, and the service provider 110 can process this information to discover what features of the products a particular user 101 wants. This information can be discovered in some embodiments by a data mining module 114 that can be configured to process information explicitly given by users such as social security numbers, driver license numbers, home addresses, job descriptions, group membership information, i.e., whether the subscriber is members of a family group (e.g., cellular phone plan), a work group, and/or members of a group based on their interests (e.g., subscribe to consumer electronics RSS feed), etc. In some embodiments of the present disclosure, the user profile may contain information such as what products the user 101 has purchased in the past from a website affiliated with the service provider 110.

In addition to feedback given by the users, the data mining module 114 can process information related to the attributes of products to discover what features a user 101 is interested in. For example, each product may have metadata associated with them that describes features of the product. The database management system 116 can create relationships between the products based on common features. The database management system 116 can infer that a user 101 that purchased one product will probably have similar tastes as another person that bought the same product. The inference is only strengthened if the user 101 has purchased multiple products that were purchased by another user. The information describing what products a user 101 purchased can be obtained in one embodiment by monitoring the Internet usage of the user 101 via a monitoring module 111. A user 101 may access the Internet via their mobile device's Internet browser to view or purchase products and services online. A copy of the web pages viewed by the user 101, or the url of the web pages may be recorded by, for example, the mobile device 103, a mobile switching center 106, and/or the monitoring module 111 optionally located at the company 120, or the service provider 110. This information can be transmitted to the service provider 110 in some embodiments, and associated with an account of the user 101 stored in a databases 112. In another embodiment, the service provider 110 may receive information from company 120 that identifies what products the user 101 has purchased in the past. In another example, the service provider 110 may send advertisements to the user 101 that display products that were purchased by users with similar tastes and monitor the user's response to the advertisements. In yet another example, information related to complaints received by users can be entered into the database 112, and the complaint can be associated with feature of the product. In a specific example, multiple users may contact a call center and complain about the battery life of their cellular phone. A customer service representative can open up the user's account on a terminal, and input information indicating that a user 101 is upset about the performance of the battery. The representative may have one or more fields where they can enter information related to the problem. The data miner 114 can process the user account information and identify that users with certain characteristics are upset with the battery performance of the cell phone and associate this negative feedback with the battery of the phone.

This information can be used to discover trends in groups of users, i.e., users in a group that share characteristics such as similar educational levels or professions. For example, groups of users can be separated based on their profiles and by processing their profiles a data miner 114 can discover what products, and features the users in this group want, what features they don't want, and what they are willing to pay for products that includes the desired features.

Referring again to FIG. 5, it additionally depicts operation 506 that shows comparing a list including the desired feature to a list of actual features in the product. For example, and in addition to the previous example, once a desired feature related to the category the product is in has be obtained by the search module 115, the analysis module 119 can compare a list that includes the desired feature to a list of actual features in the product. For example, if the user profile of a user 101 identifies that they want one thing in a product, such as "push e-mail" capability, the list of desired features may only include this entry. In another example, a user 101 may want dozens of features in a product, and the list of desired features can have hundreds of entries. In either case, the analysis module 119 can compare the list of features in the user 101 wants to the product the user 101 wants to receive information about.

Referring again to FIG. 5, it additionally depicts operation 508 that shows modifying the price of the product when the list of the actual features in the product does not include the desired feature. For example, in certain situations the product may not include the feature desired by the user 101. In some embodiments, the system can be configured to change the price of the product in order to entice the user 101 into purchasing the product even though it does not have all, or any, of the features the user 101 wants. In this example, the financial forecasting module 118 may perform one or more market related calculations to determine for example, the price of a cellular device that would include all, or some, of the desired features. In this example, the financial forecasting module 118 can look up similar products that include the desired feature and compare the prices to the product requested by the user 101 to determine how much a product with all the desired features would cost. In another example, financial data can be collected for each product, and an economic analysis can be performed to determine the relative worth of each feature in a product. For example, a Wi-Fi capable integrated circuit could be analyzed and a dollar amount can be assigned to it that reflects how much the chip is worth. Then, the net worth of a device that includes the chip can be determined. In some instances, if the device includes all of the desired features a user 101 wants, the service provider can raise the price of the device. In this instance, the service provider 110 knows that the user 101 wants the product and can leverage that information to bargain a better deal for itself. In another embodiment, the web page can allow the user 101 to submit an offer to purchase the product at a different price than the initial listing price. In this example, the service provider 101 can have already calculated how much the product with desired features is worth to the user 101 and can preconfigured the system to authorize purchases that capture a certain percentage this amount. In some instances of this embodiment, a system administrator can preconfigured the system to emphasize or deemphasize features of products based on business related factors. In this embodiment, the service provider 110 can accept offers that are extremely low for products, if the product includes a feature that the service provider 110 is not profitable, or in other embodiments, an administrator can configure the system to require the full price be paid for devices that include certain newly developed, or hot ticket, features that the user 101 wants.

Referring again to FIG. 5, it additionally depicts operation 510 that shows transmitting a signal indicative of the modified price of the product to the device. For example, and in addition to the previous example, once a modified price has been determined, the price can be transmitted to the requesting device. In some embodiments, the modified price can be listed instead of the original price. In this embodiment, the user 101 may not be aware that the price has been changed. In other embodiments, the modified price can be listed in addition to the unmodified price. In these embodiments, a reason can be given as to why the price has been changed, i.e., the web page of the product can state that the price has been reduced because the device does not have a 'QWERTY' keyboard.

Figure 6:
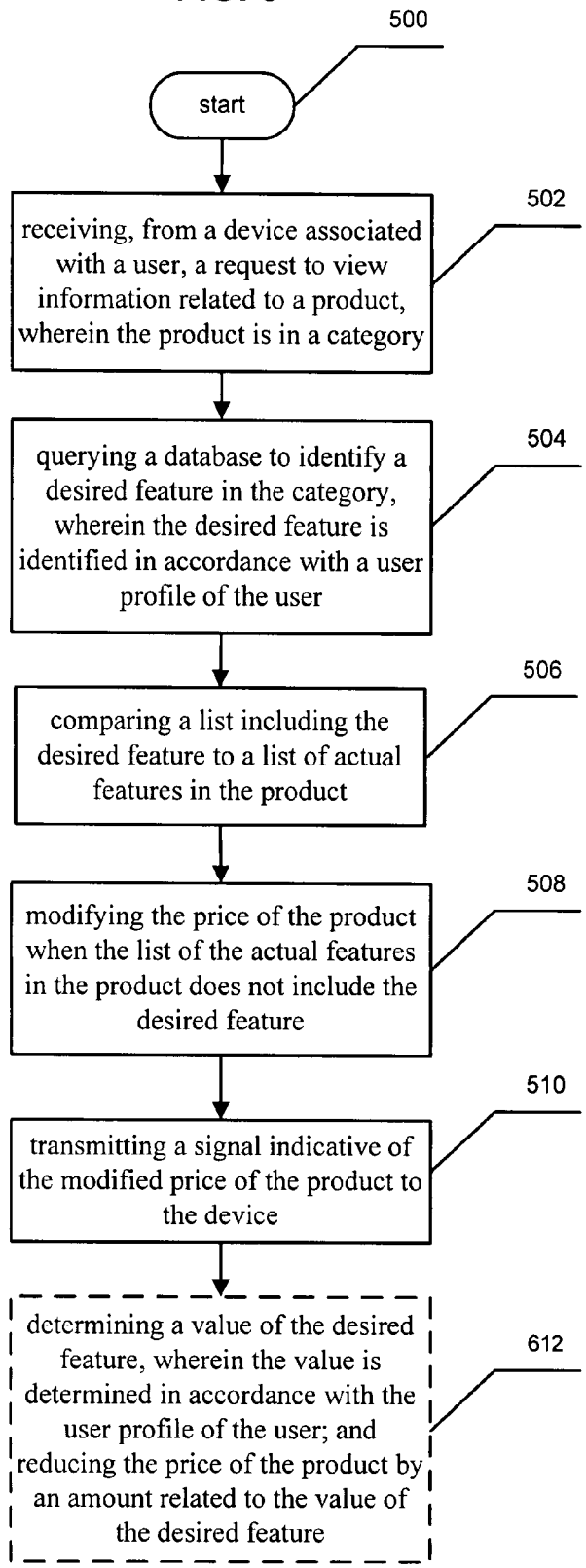
FIG. 6 depicts an alternative embodiment of the operational flow chart 500 of FIG. 5.

Referring now to FIG. 6, it depicts an alternative embodiment of the operational procedure 500 of FIG. 5 including the additional operation 612 that shows determining a value of the desired feature, wherein the value is determined in accordance with the user profile of the user; and reducing the price of the product by an amount related to the value of the desired feature. For example, in some embodiments of the present disclosure, the value of the desired feature can be determined and the price of the product can be reduced by an amount equal to the value of the feature to the user 101. For example, a desired feature of a mobile device can be identified as "push e-mail capability" and the value of the feature to the user 101 can be determined. For example, the user's purchasing trend may identify that the user 101 only purchase mobile devices with push e-mail capability. This information can be used by the analysis module 119 to infer that the user 101 only wants devices with this feature. In this example, the price of the product can be reduced by the amount related to how much the user 101 desires the feature in the product. For example, if a trend, or feedback from a user 101 indicates that they only buy devices with push email capability, the price of a device without the feature can be reduced more than if the trend, or feedback, indicates that the user 101 is only casually interested in this feature. In some embodiments this can be an iterative process. For example, the first time a user 101 views a product lacking the feature, the price of the device can be dropped a predetermined percentage. If the user 101, does not make the purchase, the service provider 110 can use that information to conclude that the price reduction was not enough for this user 101, and the next time a user 101 views a product that lacks the feature, the service provider 110 can reduce the price by a larger percentage. This process can continue until a purchase is eventually made, or a cost benefit analysis performed by the analysis module 119 in conjunction with a financial forecasting module 118 indicates that it will not be profitable to drop the price to a point where this sale can be made.

Figure 7:
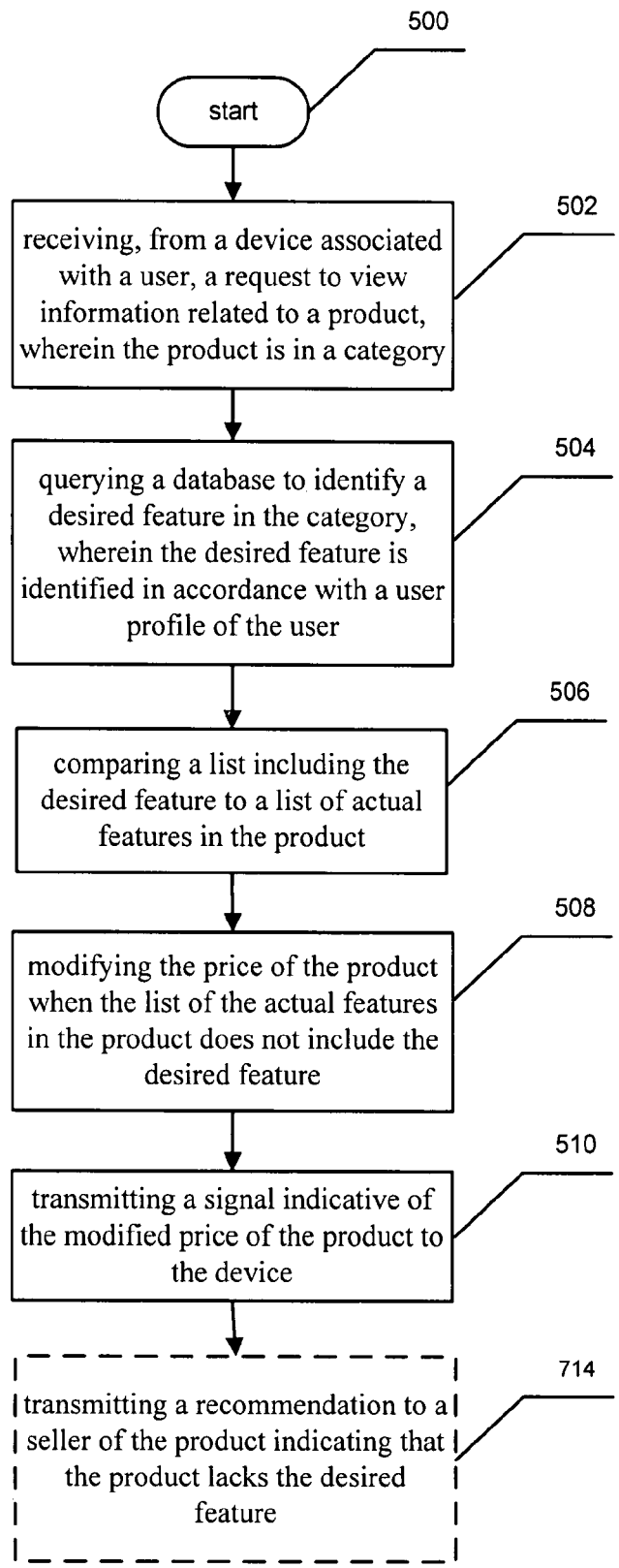
FIG. 7 depicts an alternative embodiment of the operational flow chart 500 of FIG. 5.

Referring now to FIG. 7, it depicts an alternative embodiment of the operational procedure 500 of FIG. 5 including the additional operation 714 that shows transmitting a recommendation to a seller of the product indicating that the product lacks the desired feature. Similar to that described above, if the system determines that a product lacks a desired feature, a recommendation can be transmitted to the seller, i.e., company 120. In some embodiments the recommendation can include information such as what feature the user 101 wants, how many other users want the same feature, the price of the feature, the closest competing product, etc. In some embodiments this can transmitted in the body of an email, a spreadsheet electronically transmitted to the company 120, or in any format that can be perceivable by a person working for a company 120.

Figure 8:
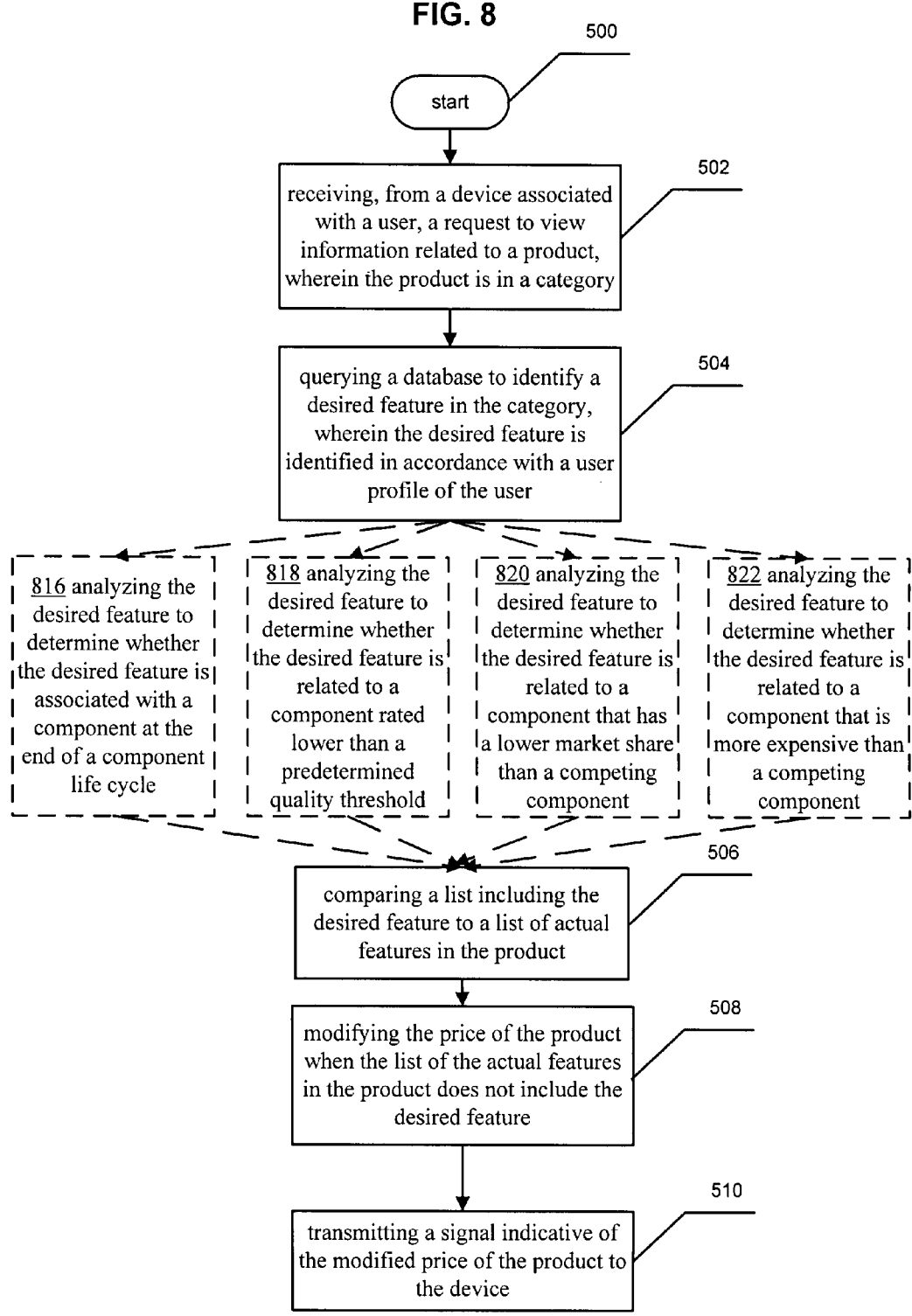
FIG. 8 depicts an alternative embodiment of the operational flow chart 500 of FIG. 5.

Referring now to FIG. 8, it depicts an alternative embodiment of the operational procedure 500 of FIG. 5 including the additional operations 816, 818, 820, and 822. Operation 816 depicts analyzing the desired feature to determine whether the desired feature is associated with a component at the end of a component life cycle. For example, a life cycle of a component describes the components introduction to the market, growth in the market, maturity, and decline in the market. If a component is newly introduced into the market, the component may not have sufficient market share, however there is potential for the components share to grow, whereas a component that has been losing market share over a time period may signal that the component is near the end of its life. If the analysis module 119 determines that sales of the component are declining, for example, an attribute can be generated that identifies that the this component is a weakness of the product and this information can be transmitted to the company 120 that sells the product. This information can indicate that, while users desire a certain feature that is associated, or implemented with a certain component that is near the end of its life cycle and a new component may be necessary.

Referring again to FIG. 8, operation 818 depicts analyzing the desired feature to determine whether the desired feature is related to a component rated lower than a predetermined quality threshold. Similar to that described above, if the desired feature is implemented by a component that, for example, includes a serious flaws, i.e., it fails, or is made by a company with a bad reputation, an attribute can be generated that identifies this component as a weakness of the product. The information can be transmitted to company 120 that indicates that users want a feature, but the current component that implements the feature is problematic. In this example, the company may not want to lower the price of the product to make the sale because it would be placing a potentially dangerous product into the consumer market, or in other embodiments, the company 120 may attempt to contact another company that can supply a safer version of the component. In certain embodiments, information such as the reputation of the company that manufactures the component can be tracked and used to determine whether a component is problematic. For example, the database 112 can include information obtained from the better business bureau or from technical reviews of the component.

Referring again to FIG. 8, operation 820 depicts analyzing the desired feature to determine whether the desired feature is related to a component that has a lower market share than a competing component. For example, in certain embodiments of the present disclosure, the analysis module 119 can compare the market share of a component that implements the desired feature that the company currently uses, to the market share of competing components that implement the same feature to determine whether the component is a weakness of the product. For example, in some situations there may be multiple components of similar type that hit the market at the same time, i.e., the industry has not yet decided on a standard way to create the component, or settled on a standard protocol. In this instance, the analysis module 119 can analyze the market share of each component in order to predict what direction the market will go, i.e., what format or protocol the industry will conform to, if a majority of companies are using a component that uses the same protocol, or form factor, this may signal that components using a different protocol or form factor may be undesirable. In this example, if the market share of a component is lower that its competitor, or lower than a predetermined percentage, the component can be identified as a weakness to the product. If the component that the company currently users to implement the desired feature has a lower market share than a competitor, the analysis module 119 make less of a price reduction than if the component was for a popular feature. In addition, a recommendation can be sent to the service provider indicating that user' want this feature and the components the company 120 uses to implement that feature are not as popular as competitor components.

Referring again to FIG. 8, operation 822 depicts analyzing the desired feature to determine whether the desired feature is related to a component that is more expensive than a competing component. In some example embodiments of the present disclosure, the analysis module 119 can be configured to determine whether a component currently used by the company 120 to enable a desired feature costs more to purchase from a manufacture, or to make, than a competing component that enables the same, or a similar feature. For example, there may be multiple companies that create a component that performs the same function as the one desired by the user 101, for example, a 802.11 transceiver integrated circuit manufactured by different companies. Certain companies may sell their component, in this example the IC, at different prices depending on the companies financial situation, outstanding loans, fabrication process etc. In certain embodiments of the present disclosure, the analysis module 119 can compare the price of the component to similar components sold by different manufactures to determine if the price of the component currently in the product is a weakness of the product. Similar to that above, a component can be considered a weakness in one embodiment if it costs more than a competitor, and in other embodiments a component can be considered a weakness if it priced more than a predetermined percentage of the lowest selling competitor component, or the average price of competitor components.

Figure 9:
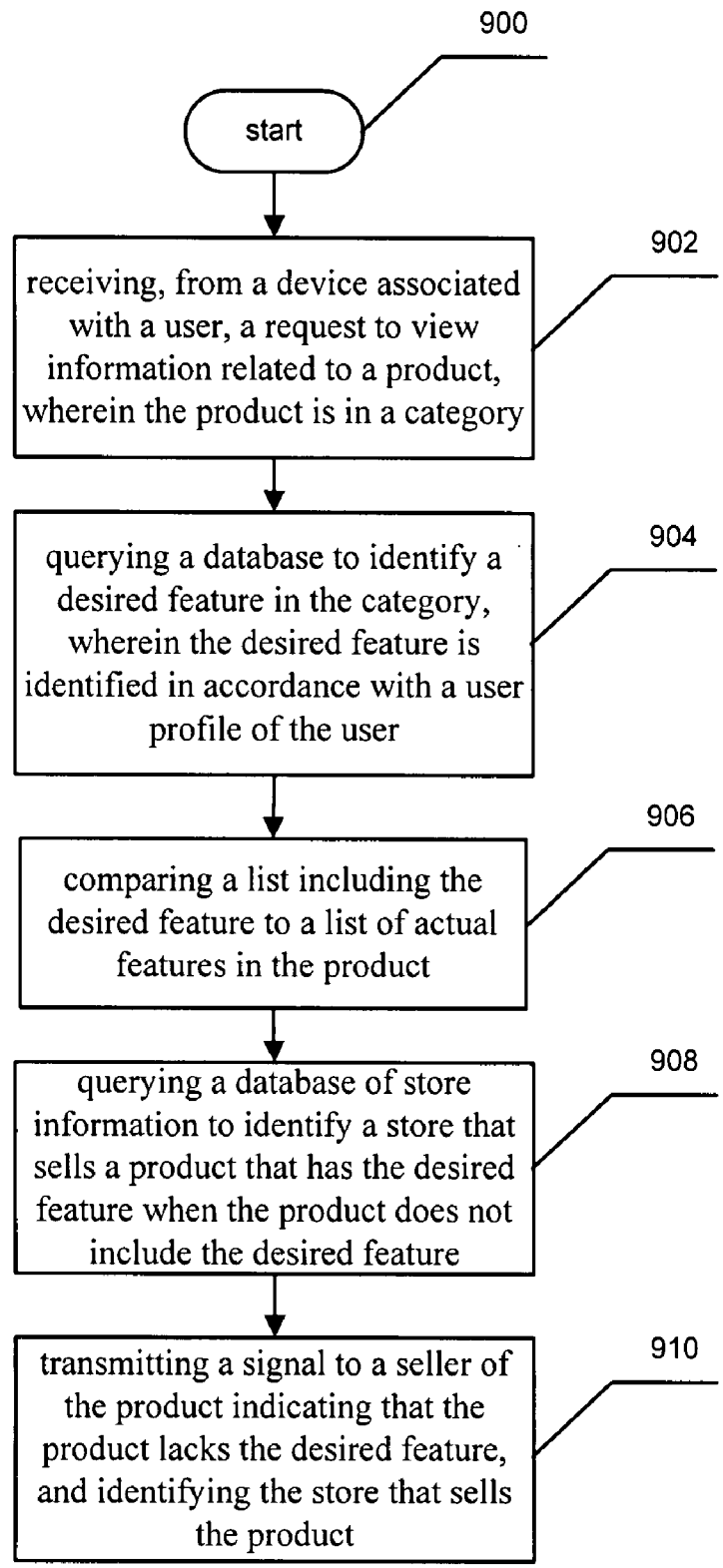
FIG. 9 depicts an exemplary operational flow chart 900 illustrating aspects of the present disclosure.

Referring now to FIG. 9, it depicts an example operational procedure depicting aspects of the present disclosure that can include one or more of the example operations 800, 902, 904, 906, 908, and 910. As shown by FIG. 9, operation 900 beings the operational procedure and operation 902 shows receiving, from a device associated with a user, a request to view information related to a product. For example, in one embodiment of the present disclosure, a web server 122 of a company 120 can be configured to receive requests from devices that have a network connection to the company 120. In one embodiment, a device can be a mobile device 103, such as a cellular phone, PDA, etc., while in another embodiment the device can be a personal computer connected to a network such as the Internet. In alternative embodiments, instead of a web server of the company 120 receiving a request, the service provider 110 can receive the request to view information about a product, sold by company 120. In this embodiment, a web server 123 of service provider 110 can host information about products offered by company 120, and have access to the company's database 113 that includes product information, or have the information stored in its own database 112. In one example embodiment, the request can be to view information about a product, i.e., the request may be to view a web page that includes information about a cellular phone.

Continuing with the example, FIG. 9 additionally depicts querying a database to identify a desired feature in the category, wherein the desired feature is identified in accordance with a user profile of the user 101. For example, and in addition to the previous example, once a request to view information about a product is received, the identity of the user 101 associated with the device can be determined by, in the instance that the device is a mobile device 103, a monitoring module 111 that can be configured to scan identification information sent by the mobile device 103. In some embodiments, the identification information can include the phone number of the mobile device 103. In this instance, the number can linked to a user account maintained by the service provider 110. After the identity of the user 101 is determined, a search module 115, optionally located, at the service provider 110, or at the company 120, can query a database 112 to determine what features the user 101 wants in products similar to those the user 101 wants to view information about. For example, if a user 101 is trying to view a web page with information about a cellular phone, the search module 115 can query the database for features that the user 101 wants in a cellular phone category.

In one example embodiment, a feature of a product can be a something the product offers, such as, a characteristic, a part, a color, an ability, or something else distinctive. For example, a mobile device may have hundreds of features, such as its form factor, the material its made out of, its battery life, the dimensions of its user interface, the software included with the device, the software compatible with the device, etc. Those skilled in the art can appreciate that the preceding list is exemplary and that other features can exist. The features of a product can be identified using various techniques, and stored in a database such as database 112. In some example embodiments, the database 112 can store information obtained from users that indicate what products or services they like, and what features in products they want. For example, each user 101 can provide feedback to the service provider 110 related to a plurality of products, and the service provider 110 can process this information to discover what features of the products a particular user 101 wants. This information can be discovered in some embodiments by a data mining module 114 that can be configured to process information explicitly given by users such as social security numbers, driver license numbers, home addresses, job descriptions, group membership information, i.e., whether the subscriber is members of a family group (e.g., cellular phone plan), a work group, and/or members of a group based on their interests (e.g., subscribe to consumer electronics RSS feed), etc. In some embodiments of the present disclosure, the user profile may contain information such as what products the user 101 has purchased in the past from a website affiliated with the service provider 110.

In addition to feedback given by the users, the data mining module 114 can process information related to the attributes of products to discover what features a user is interested in. For example, each product may have metadata associated with them that describes features of the product. The database management system 116 can create relationships between the products based on common features. The database management system 116 can infer that a user 101 that purchased one product will probably have similar tastes as another person that bought the same product. The inference is only strengthened if the user 101 has purchased multiple products that were purchased by another user. The information describing what products a user 101 purchased can be obtained in one embodiment by monitoring the Internet usage of the user 101 via a monitoring module 111. A user 101 may access the Internet via their mobile device's Internet browser to view or purchase products and services online. A copy of the web pages viewed by the user 101, or the url of the web pages may be recorded by, for example, the mobile device 103, a mobile switching center 106, and/or the monitoring module 111 optionally located at the company 120, or the service provider 110. This information can be transmitted to the service provider 110 in some embodiments, and associated with an account of the user 101 stored in a databases 112. In another embodiment, the service provider 110 may receive information from company 120 that identifies what products the user 101 has purchased in the past. In another example, the service provider 110 may send advertisements to the user 101 that display products that were purchased by users with similar tastes and monitor the user's response to the advertisements. In yet another example, information related to complaints received by users can be entered into the database 112, and the complaint can be associated with feature of the product. In a specific example, multiple users may contact a call center and complain about the battery life of their cellular phone. A customer service representative can open up the user's account on a terminal, and input information indicating that a user 101 is upset about the performance of the battery. The representative may have one or more fields where they can enter information related to the problem. The data miner 114 can process the user account information and identify that users with certain characteristics are upset with the battery performance of the cell phone and associate this negative feedback with the battery of the phone.

This information can be used to discover trends in groups of users, i.e., users in a group that share characteristics such as similar educational levels or professions. For example, groups of users can be separated based on their profiles and by processing their profiles a data miner 114 can discover what products, and features the users in this group want, what features they don't want, and what they are willing to pay for products that includes the desired features.

Referring again to FIG. 9, it shows operation 906 that depicts comparing a list including the desired feature to a list of actual features in the product. For example, and in addition to the previous example, once a desired feature related to the category the product is in has be obtained by the search module 115, the analysis module 119 can compare a list that includes the desired feature to a list of actual features in the product. For example, if the user profile of a user 101 identifies that they want one thing in a product, such as "push e-mail" capability, the list of desired features may only include this entry. In another example, a user 101 may want dozens of features in a product, and the list of desired features can have hundreds of entries. In either case, the analysis module 119 can compare the list of features in the user 101 wants to the product the user 101 wants to receive information about.

Referring again to FIG. 9, it shows operation 908 that illustrates querying a database of store information to identify a store that sells a product that has the desired feature when the product does not include the desired feature. For example, and in addition to the previous example, a search module 115 can be configured to determine whether the company 120 currently sells a product that includes the feature the user 101 is interested in. For example, if a user 101 connects to a website via a mobile device 103 and sends a request to view a web page that depicts a specific cellular phone, a search module 115 can query a database of information that includes the catalog of the company 120 to determine whether the company 120 sells a cellular phone that includes feature desired by the user 101. For example, if a user 101 has been identified as one that desires a full QWERTY keyboard in any cellular phone they buy, the search module 115 can be configured to look for devices that include such a keyboard. In the event that the company 120 does not have a cellular phone that includes the desired feature, the search module 115 can be configured to submit a query to the database 112 for a supplier identify 125-A, and/or 125-B that does sell a phone with that feature.

Referring again to FIG. 9, it shows operation 910 that illustrates transmitting a signal to a seller of the product indicating that the product lacks the desired feature, and identifying the store that sells the product. For example, and in addition to the previous example, after the desired feature is identified, and a product is found that includes the feature, if the product is sold by a certain supplier a signal can be sent to the company 120. In some example embodiments, the signal can include information indicating that a user 101, or a plurality of users have been viewing the company's products and the user, is interested in products that have certain features. The signal can also identify a supplier of a product that has the feature. In this example, a report can be transmitted in the body of an email, as a spreadsheet, or in any format that can be perceivable by a person working for a company 120.

Referring now to FIG. 10, it depicts an alternative embodiment of the operational procedure 900 of FIG. 9 including the additional operations 1012, 1014, 1016, and 1018. Operation 1012 shows analyzing the desired feature to determine whether the desired feature is associated with a component at the end of a component life cycle. For example, a life cycle of a component describes the components introduction to the market, growth in the market, maturity, and decline in the market. If a component is newly introduced into the market, the component may not have sufficient market share, however there is potential for the components share to grow, whereas a component that has been losing market share over a time period may signal that the component is near the end of its life. If the analysis module 119 determines that sales of the component are declining, for example, an attribute can be generated that identifies that the this component is a weakness of the product and this information can be transmitted to the company 120 that sells the product. This information can indicate that, while users desire a certain feature that is associated, or implemented with a certain component that is near the end of its life cycle and a new component may be necessary.

Referring again to FIG. 10, operation 1014 depicts analyzing the desired feature to determine whether the desired feature is related to a component rated lower than a predetermined quality threshold. Similar to that described above, if the desired feature is implemented by a component that, for example, includes a serious flaws, i.e., it fails, or is made by a company with a bad reputation, an attribute can be generated that identifies this component as a weakness of the product. The information can be transmitted to company 120 that indicates that users want a feature, but the current component that implements the feature is problematic. In this example, the company may not want to lower the price of the product to make the sale because it would be placing a potentially dangerous product into the consumer market, or in other embodiments, the company 120 may attempt to contact another company that can supply a safer version of the component. In certain embodiments, information such as the reputation of the company that manufactures the component can be tracked and used to determine whether a component is problematic. For example, the database 112 can include information obtained from the better business bureau or from technical reviews of the component.

Referring again to FIG. 10, operation 1016 depicts analyzing the desired feature to determine whether the desired feature is related to a component that has a lower market share than a competing component. For example, in certain embodiments of the present disclosure, the analysis module 119 can compare the market share of a component that implements the desired feature that the company currently uses, to the market share of competing components that implement the same feature to determine whether the component is a weakness of the product. For example, in some situations there may be multiple components of similar type that hit the market at the same time, i.e., the industry has not yet decided on a standard way to create the component, or settled on a standard protocol. In this instance, the analysis module 119 can analyze the market share of each component in order to predict what direction the market will go, i.e., what format or protocol the industry will conform to, if a majority of companies are using a component that uses the same protocol, or form factor, this may signal that components using a different protocol or form factor may be undesirable. In this example, if the market share of a component is lower that its competitor, or lower than a predetermined percentage, the component can be identified as a weakness to the product. If the component that the company currently users to implement the desired feature has a lower market share than a competitor, the analysis module 119 make less of a price reduction than if the component was for a popular feature. In addition, a recommendation can be sent to the service provider indicating that user' want this feature and the components the company 120 uses to implement that feature are not as popular as competitor components.

Referring again to FIG. 10, operation 1018 depicts analyzing the desired feature to determine whether the desired feature is related to a component that is more expensive than a competing component. In some example embodiments of the present disclosure, the analysis module 119 can be configured to determine whether a component currently used by the company 120 to enable a desired feature costs more to purchase from a manufacture, or to make, than a competing component that enables the same, or a similar feature. For example, there may be multiple companies that create a component that performs the same function as the one desired by the user 101, for example, a 802.11 transceiver integrated circuit manufactured by different companies. Certain companies may sell their component, in this example the IC, at different prices depending on the companies financial situation, outstanding loans, fabrication process etc. In certain embodiments of the present disclosure, the analysis module 119 can compare the price of the component to similar components sold by different manufactures to determine if the price of the component currently in the product is a weakness of the product. Similar to that above, a component can be considered a weakness in one embodiment if it costs more than a competitor, and in other embodiments a component can be considered a weakness if it priced more than a predetermined percentage of the lowest selling competitor component, or the average price of competitor components.

Referring now to FIG. 11, it depicts an alternative embodiment of the operational procedure 900 of FIG. 9 including an additional operation 1120 that shows identifying a plurality of desired components for a product, in accordance with a plurality of user profiles; identifying a supplier for each component of the plurality of desired components; calculating a price of a product that includes the plurality of desired components; and transmitting a signal to the seller identifying the plurality of desired components, the supplier for each desired component, and the price of a product that includes the plurality of desired components. For example, in certain embodiments of the present disclosure, a monitoring module 111 can be configured to monitor a web server such as web server 122 or 123. In this example, the monitoring module 111 can be configured to identify each user 101 that connects to the web server. In this example, users can be identified by the service provider 110, a search module 115, optionally located at the service provider 110, or at the company 120, can query a database 112 to determine what features the users wants in products.

Continuing with this example, the search module 115 can be configured to search a database 112 that includes catalogs from suppliers 125-A, and/or 125-B for the desired features. In one specific example, if the product is a cellular phone, the search module 115 can search for a supplier, for example, that manufactures full QWERTY keyboards and another that creates push e-mail software. In this example, the financial forecasting module 118 may perform one or more market related calculations to determine for example, the price of a cellular device that would include all the desired features.

After the desired feature are identified, and the price of a product that includes the desired features has been calculated, a recommendation can be generated. In some example embodiments, the recommendation can indicate to the company 120 that one or more users are looking to buy products with a certain feature. It can also identify one or more suppliers of the components that would give the product the desired feature. In this example, a report can be transmitted in the body of an email, a spreadsheet, or any format that can be perceivable by a person working for a company 120.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

What is claimed:

1. A method comprising:
identifying, by a processor of a monitor module of a system, the system comprising the monitor module, a search module, an analysis module, a financial forecasting module, and a data minor module, a type of product that has been purchased less than a predetermined number of times;
accessing, by a processor of the search module, a database of attributes that includes attributes for a plurality of components in the product;
identifying, by a processor of the analysis module, a weak component in the product, wherein the weak component is associated with an attribute that has a rating lower than a predetermined threshold, the predetermined threshold comprising a user review threshold rating;
identifying, by a processor of the financial forecasting module, growth potential for the weak component and an opportunity of the product in a competing market; and
processing, by a processor of the data minor module, user reviews regarding the weak component; and
generating, by a processor of the analysis module, a report comprising an indication of how the product was identified, an attribute of the weak component that affected a weakness score for the product, and a recommendation, the recommendation comprising an opportunity of the product in a competing market.

2. The method of claim 1, wherein the weak component is associated with an attribute identifying that the component is at the end of a component life cycle.

3. The method of claim 1, wherein the weak component is associated with an attribute identifying that the component is rated lower than a predetermined quality threshold.

4. The method of claim 1, wherein the weak component is associated with an attribute identifying that the component is rated lower than a predetermined user review threshold.

5. The method of claim 1, wherein the weak component is associated with an attribute identifying that the component that has a lower market share than a competing component.

6. The method of claim 1, wherein the weak component is associated with an attribute identifying that the component is more expensive than a competing component.

7. The method of claim 1, further comprising:
identifying the replacement component for the weak component; and
generating a recommendation to replace the weak component with the replacement component.

8. A system comprising:
a monitor module, a search module, an analysis module, a financial forecasting module, and a data minor module, a type of product that has been purchased less than a predetermined number of times, the system configured to:
identify, by a processor of the monitor module, a type of product that has been purchased less than a predetermined number of times;
access, by a processor of the search module, a database of attributes that includes attributes for a plurality of components in the product;
identify, by a processor of the analysis module, a weak component in the product, wherein the weak component is associated with an attribute that has a rating lower than a predetermined threshold, the predetermined threshold comprising a user review threshold rating;

identify, by a processor of the financial forecasting module, growth potential for the weak component and an opportunity of the product in a competing market;

process, by a processor of the data minor module, user reviews regarding the weak component; and generate, by a processor of the analysis module, a report comprising an indication of how the product was identified, an attribute of the weak component that affected a weakness score for the product, and a recommendation, the recommendation comprising an opportunity of the product in a competing market.

9. The system of claim 8, wherein the weak component is associated with an attribute identifying that the component is at the end of a component life cycle.

10. The system of claim 8, wherein the weak component is associated with an attribute identifying that the component is rated lower than a predetermined quality threshold.

11. The system of claim 8, wherein the weak component is associated with an attribute identifying that the component is rated lower than a predetermined user review threshold.

12. The system of claim 8, wherein the weak component is associated with an attribute identifying that the component that has a lower market share than a competing component.

13. The system of claim 8, wherein the weak component is associated with an attribute identifying that the component is more expensive than a competing component.

14. The system of claim 8, further comprising:
identifying the replacement component for the weak component; and
generating a recommendation to replace the weak component with the replacement component.

* * * * *